(12) United States Patent
Li et al.

(10) Patent No.: US 12,159,539 B2
(45) Date of Patent: Dec. 3, 2024

(54) UNMANNED AERIAL VEHICLE RETURN METHOD AND APPARATUS AND UNMANNED AERIAL VEHICLE

(71) Applicant: AUTEL ROBOTICS CO., LTD., Guangdong (CN)

(72) Inventors: Yingjie Li, Guangdong (CN); Gang Chen, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 230 days.

(21) Appl. No.: 17/655,046

(22) Filed: Mar. 16, 2022

(65) Prior Publication Data
US 2022/0238029 A1  Jul. 28, 2022

Related U.S. Application Data

(63) Continuation of application No. PCT/CN2020/115378, filed on Sep. 15, 2020.

(30) Foreign Application Priority Data

Sep. 17, 2019 (CN) .......................... 201910876714.1

(51) Int. Cl.
*G08G 5/00* (2006.01)
*B64C 39/02* (2023.01)
(Continued)

(52) U.S. Cl.
CPC ........... *G08G 5/0039* (2013.01); *B64U 10/14* (2023.01); *B64U 50/19* (2023.01); *G05D 1/101* (2013.01);
(Continued)

(58) Field of Classification Search
CPC .. G08G 5/0039; G08G 5/0069; G08G 5/0021; B64C 39/024; G05D 1/101;
(Continued)

(56) References Cited

U.S. PATENT DOCUMENTS

2010/0152933 A1* 6/2010 Smoot .................. G05D 1/0676
701/16
2010/0250020 A1 9/2010 Lee
(Continued)

FOREIGN PATENT DOCUMENTS

CN 104516354 A 4/2015
CN 104881039 A * 9/2015
(Continued)

OTHER PUBLICATIONS

Machine Translation: CN-104881039-A (Year: 2015).*
PCT/CN2020/115378 International Search Report mailed Dec. 17, 2020.

*Primary Examiner* — Anne Marie Antonucci
*Assistant Examiner* — Connor L Knight
(74) *Attorney, Agent, or Firm* — Frank Gao, Esq.

(57) ABSTRACT

An unmanned aerial vehicle (UAV) return method and apparatus and a UAV. The method includes: performing real-time fusion to generate velocity information of the UAV; determining, through integrating the velocity information, displacement information of a current location of the UAV relative to a takeoff location; determining a return starting point location of the UAV according to the displacement information; obtaining a return instruction, and determining a return mode; and controlling, according to the return mode, the UAV to return from the return starting point location to the takeoff location. In the foregoing manner, the present invention resolves the technical problem of poor accuracy that a current UAV returns by relying on GPS location information, and improves the returning accuracy of the UAV.

15 Claims, 4 Drawing Sheets

(51) Int. Cl.
  *B64U 10/14*    (2023.01)
  *B64U 50/19*    (2023.01)
  *G05D 1/00*     (2006.01)
  *G05D 1/10*     (2006.01)
  *B64U 101/31*   (2023.01)

(52) U.S. Cl.
  CPC ....... *G08G 5/0069* (2013.01); *B64U 2101/31* (2023.01); *B64U 2201/00* (2023.01)

(58) Field of Classification Search
  CPC .. G05D 1/0202; B64U 10/13; B64U 2201/00; B64U 2101/31; B64U 10/14; B64U 50/19; B64U 2201/10
  See application file for complete search history.

(56) References Cited

U.S. PATENT DOCUMENTS

| | | | |
|---|---|---|---|
| 2016/0070265 A1* | 3/2016 | Liu | B64C 39/024 701/25 |
| 2018/0188032 A1* | 7/2018 | Ramanandan | G01S 19/52 |
| 2019/0220039 A1* | 7/2019 | Wu | B64D 47/08 |
| 2019/0339721 A1* | 11/2019 | Han | G05D 1/106 |
| 2020/0175882 A1* | 6/2020 | Singh | G05D 1/0022 |

FOREIGN PATENT DOCUMENTS

| | | | |
|---|---|---|---|
| CN | 105446355 A | 3/2016 | |
| CN | 105556409 A | 5/2016 | |
| CN | 106708088 A | 5/2017 | |
| CN | 107831776 A | 3/2018 | |
| CN | 109240329 A | 1/2019 | |
| CN | 110568860 A | 12/2019 | |

\* cited by examiner

UNMANNED AERIAL VEHICLE RETURN METHOD AND APPARATUS AND UNMANNED AERIAL VEHICLE

CROSS-REFERENCE TO RELATED APPLICATIONS

The present application is a continuation of the International Application NO. PCT/CN2020/115378, filed on Sep. 15, 2020, which claims priority to Chinese Patent Application No. 2019108767141, filed on Sep. 17, 2019, which is incorporated herein by reference in its entirety.

TECHNICAL FIELD

The present invention relates to the field of aerial vehicle technologies, and in particular, to an unmanned aerial vehicle (UAV) return method and apparatus and a UAV.

BACKGROUND

An unmanned aerial vehicle (UAV), as referred to as an unmanned aircraft, has been increasingly widely applied due to advantages of a small size, a light weight, maneuverability, quick response, unmanned driving, and low operation requirements. Various actions (or attitudes) of the UAV are generally implemented by controlling different rotating velocities of a plurality of drive motors in a power system of the UAV.

During flight, the unmanned aircraft relies on takeoff point location coordinates provided by the Global Positioning System (GPS). However, the GPS location precision relies on GPS signal quality. When the GPS signal quality is poor, the initial takeoff point location coordinates provided by the GPS deviate greatly. After the unmanned aircraft flies for a period of time, GPS location information converges to better precision, and in this case, the location information provided by the GPS deviates from location information when the aircraft takes off. An inaccurate initial takeoff point leads to an inaccurate location when the aircraft returns, and an original location cannot be returned after returning, thereby greatly affecting the flight experience. Because a low-cost GPS is generally used by a consumer unmanned aircraft, a probability of inaccurate return point location greatly increases. In addition, the uncertainty of takeoff environmental conditions such as a weak GPS signal caused by a cloudy day, obscuring of a GPS signal by vegetation and the like, and a multipath effect caused by a glass curtain wall and the like causes that the initial location information provided by only relying on the GPS is particularly inaccurate. As a result, the unmanned aircraft cannot return accurately.

SUMMARY

Embodiments of the present invention provide a UAV return method and apparatus and a UAV, to resolve the technical problem of poor accuracy that a current UAV returns by relying on GPS location information, and improve the returning accuracy of the UAV.

To resolve the foregoing technical problem, the embodiments of the present invention provide the following technical solutions:

According to a first aspect, the embodiments of the present invention provide a UAV return method, applicable to a UAV, the method including:

performing real-time fusion to generate velocity information of the UAV;
determining, through integrating the velocity information, displacement information of a current location of the UAV relative to a takeoff location;
determining a return starting point location of the UAV according to the displacement information;
obtaining a return instruction, and determining a return mode; and
controlling, according to the return mode, the UAV to return from the return starting point location to the takeoff location.

In some embodiments, the performing real-time fusion to generate velocity information of the UAV includes:
performing real-time fusion to generate component velocities of the UAV in two orthogonal directions in a horizontal plane: an x-axis velocity and a y-axis velocity.

In some embodiments, the determining, through integrating the velocity information, displacement information of a current location of the UAV relative to a takeoff location includes:
determining an x-axis displacement between the current location of the UAV and the takeoff location through integrating the x-axis velocity; and
determining a y-axis displacement between the current location of the UAV and the takeoff location through integrating the y-axis velocity.

In some embodiments, the determining a return starting point location of the UAV according to the displacement information includes:
determining the return starting point location of the UAV according to the x-axis displacement and the y-axis displacement.

In some embodiments, if the return mode includes a linear return mode, the controlling, according to the return mode, the UAV to return from the return starting point location to the takeoff location includes:
adjusting a heading of the UAV in real time according to the x-axis displacement and the y-axis displacement, so that the heading of the UAV points to the takeoff location; and
determining the x-axis displacement and the y-axis displacement in real time during returning, and if both the x-axis displacement and the y-axis displacement are zero, determining that the UAV returns from the return starting point location to the takeoff location.

In some embodiments, if the return mode includes an original path return mode, the controlling, according to the return mode, the UAV to return from the return starting point location to the takeoff location includes:
determining coordinates of the takeoff location;
determining waypoint coordinates of the UAV in real time according to the displacement information of the current location of the UAV relative to the takeoff location, to generate a waypoint set; and
controlling, according to the waypoint set, the UAV to return from the return starting point location to the takeoff location along an original path.

In some embodiments, the determining waypoint coordinates of the UAV in real time according to the displacement information of the current location of the UAV relative to the takeoff location, to generate a waypoint set includes:
determining coordinates of the takeoff location, and marking the coordinates of the takeoff location as (m, n); and
determining the waypoint coordinates of the UAV in real time by using the following formula, to generate a waypoint set:

$$P(k) = \left(m + \frac{ox(k)}{\text{lat\_scale}}, n + \frac{oy(k)}{\text{lon\_scale}}\right),$$

where P(k) is the waypoint set, ox(k) is an x-axis displacement of a $k^{th}$ waypoint, oy(k) is a y-axis displacement of the $k^{th}$ waypoint, k is a positive integer, lat_scale is a transform coefficient between the x-axis displacement and a latitude, and lon_scale is a transform coefficient between the y-axis displacement and a longitude.

According to a second aspect, the embodiments of the present invention provide a UAV return apparatus, applicable to a UAV, the apparatus including:

a velocity information generation module, configured to perform real-time fusion to generate velocity information of the UAV;

a displacement information generation module, configured to determine, through integrating the velocity information, displacement information of a current location of the UAV relative to a takeoff location;

a return starting point location module, configured to determine a return starting point location of the UAV according to the displacement information;

a return mode determining module, configured to obtain a return instruction, and determine a return mode; and a return module, configured to control, according to the return mode, the UAV to return from the return starting point location to the takeoff location.

In some embodiments, the velocity information generation module is specifically configured to:

perform real-time fusion to generate component velocities of the UAV in two orthogonal directions in a horizontal plane: an x-axis velocity and a y-axis velocity.

In some embodiments, the displacement information generation module is specifically configured to:

determine an x-axis displacement between the current location of the UAV and the takeoff location through integrating the x-axis velocity; and determine a y-axis displacement between the current location of the UAV and the takeoff location through integrating the y-axis velocity.

In some embodiments, the return starting point location module is specifically configured to:

determine the return starting point location of the UAV according to the x-axis displacement and the y-axis displacement.

In some embodiments, the return mode includes a linear return mode, and the return module is specifically configured to:

adjust a heading of the UAV in real time according to the x-axis displacement and the y-axis displacement, so that the heading points to the takeoff location; and determine the x-axis displacement and the y-axis displacement in real time during returning, and if both the x-axis displacement and the y-axis displacement are zero, determine that the UAV returns from the return starting point location to the takeoff location.

In some embodiments, the return mode includes an original path return mode, and the return module includes:

a takeoff location coordinate unit, configured to determine coordinates of the takeoff location;

a waypoint set unit, configured to determine waypoint coordinates of the UAV in real time according to the displacement information of the current location of the UAV relative to the takeoff location, to generate a waypoint set; and a return unit, configured to control, according to the waypoint set, the UAV to return from the return starting point location to the takeoff location along an original path.

In some embodiments, the waypoint set unit is specifically configured to:

determine coordinates of the takeoff location, and marking the coordinates of the takeoff location as (m, n); and determine the waypoint coordinates of the UAV in real time by using the following formula, to generate a waypoint set:

$$P(k) = \left(m + \frac{ox(k)}{\text{lat\_scale}}, n + \frac{oy(k)}{\text{lon\_scale}}\right),$$

where P(k) is the waypoint set, ox(k) is an x-axis displacement of a $k^{th}$ waypoint, oy(k) is a y-axis displacement of the $k^{th}$ waypoint, k is a positive integer, lat_scale is a transform coefficient between the x-axis displacement and a latitude, and lon_scale is a transform coefficient between the y-axis displacement and a longitude.

According to a third aspect, the embodiments of the present invention provide a UAV, including:

at least one processor, and a memory communicatively connected to the at least one processor, where the memory stores instructions executable by the at least one processor, and the instructions are executed by the at least one processor to cause the at least one processor to perform the UAV return method described above.

According to a fourth aspect, the embodiments of the present invention further provide a non-volatile computer-readable storage medium. The computer-readable storage medium stores computer executable instructions, and the computer executable instructions are configured to cause a UAV to perform the UAV return method described above.

Beneficial effects of the embodiments of the present invention are as follows: Different from the prior art, the embodiments of the present invention provide a UAV return method, applicable to a UAV, the method including: performing real-time fusion to generate velocity information of the UAV; determining, through integrating the velocity information, displacement information of a current location of the UAV relative to a takeoff location; determining a return starting point location of the UAV according to the displacement information; obtaining a return instruction, and determining a return mode; and controlling, according to the return mode, the UAV to return from the return starting point location to the takeoff location. In the foregoing manner, the present invention resolves the technical problem of poor accuracy that a current UAV returns by relying on GPS location information, and improves the returning accuracy of the UAV.

BRIEF DESCRIPTION OF THE DRAWINGS

One or more embodiments are exemplarily described with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

Figure 1:
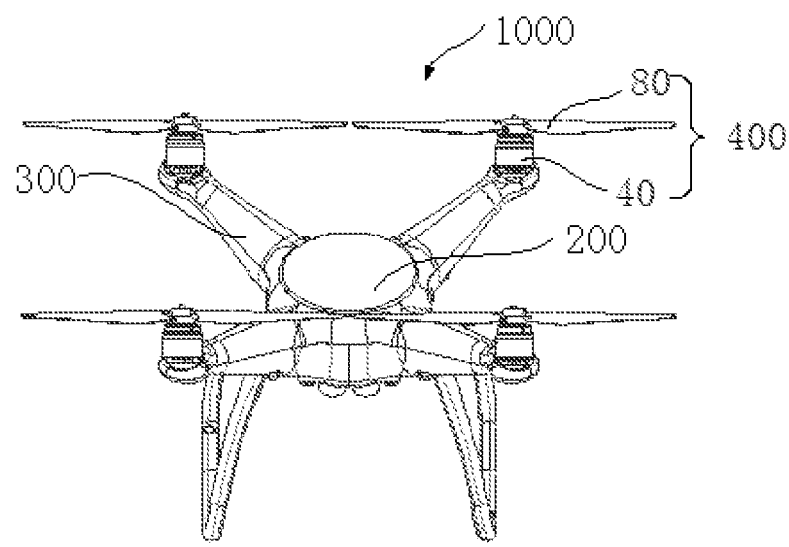
FIG. 1 is a schematic structural diagram of a UAV according to an embodiment of the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments. All other embodiments obtained by a person of ordinary skill in the art based on the embodiments of the present invention without creative efforts shall fall within the protection scope of the present invention.

In addition, technical features involved in implementations of the present invention that are described below may be combined with each other provided that no conflict occurs.

Currently, selection of a return starting point of an unmanned aircraft directly relies on absolute location information provided by the GPS, but the absolute location information is often not accurate enough. Currently, in addition to the location information provided by the GPS, the unmanned aircraft also have some return methods in which location coordinates are not heavily relied. These return methods are implemented by recording flight status information and in a manner of reverse motion of a flight process. By recording an attitude change of the unmanned aircraft after takeoff and with reference to stored map information, a flight path of the unmanned aircraft is determined, and when the GPS fails or has a weak signal, returning is implemented through reverse flight along an estimated flight path. This method requires real-time recording of an aircraft flight status and a large amount of map information. This causes a large data amount, and increases an aircraft calculation load.

Alternatively, location information and image information of the unmanned aircraft are acquired in real time during whole flight of the aircraft, and a flight map is constructed according to the acquired information. By comparing information during returning with the constructed flight map, a return path is corrected. This method has good precision but greatly occupies computing resources of the aircraft. By recording status information of a starting location of the unmanned aircraft, and recording a series of key frame images during flight, key frame matching is performed during returning to achieve this objective. This method relies on the key frame images during flight, and is insufficiently applicable in cases of a poor visual effect, a high flight height, and the like. In addition, the foregoing methods all use the manner of "reverse motion", and the returning is original returning, which greatly reduces the energy utilization efficiency.

Generally, velocity precision provided by the GPS is better than location precision. That is, when the location information provided by the GPS has a relatively large error, velocity information provided by the GPS is more accurate. With reference to this feature of the GPS, in order not to increase the cost, according to the velocity information provided by the GPS by using existing GPS data of the aircraft, the present invention implements, without adding any additional sensors, accurate returning of the unmanned aircraft by using the velocity information when the GPS location precision is poor.

A UAV return method provided in the embodiments of the present invention is applicable to various motor-driven movable objects, including, but not limited to, an aerial vehicle and a robot. The aircraft may include a UAV, an unmanned spacecraft, and the like. The UAV is used as an example now for description.

Embodiment 1

The embodiments of the present invention are further described below with reference to the accompanying drawings.

In a possible embodiment, the UAV is a quadrotor unmanned aircraft.

Specifically, referring to FIG. 1, the unmanned aircraft 1000 includes a body 200, four arms 300 extending from the body 200, a power assembly 400 mounted on each of the arms 300, an intelligent battery (not shown) disposed on the body 200, and a controller (not shown). The unmanned aircraft 1000 shown in the figure is a quadrotor UAV, and there are four power assemblies 400 configured to provide flight power for the UAV. In other possible embodiments, the unmanned aircraft 1000 may be any other suitable type of UAV, such as a fixed-wing UAV. When the power assembly 400 is applicable to another type of UAV, a quantity of the power assemblies 400 may be changed according to an actual requirement. This is not limited in the present invention.

In other possible embodiments, the unmanned aircraft 1000 may alternatively include a gimbal (not shown). The gimbal is mounted on a bottom of the body 200, and the gimbal is configured to carry a high-definition digital camera or another camera apparatus to eliminate interference to which the high-definition digital camera or another camera apparatus is subject, and ensure a clear and stable video photographed by the camera or another camera apparatus.

In a possible embodiment, the body 200 includes a center housing and one or more arms 300 connected to the center housing, and the one or more arms 300 extend radially from the center housing. The arm 300 is fixedly connected to the body 200. Preferably, the arm 300 is integrally formed with the body 200. In other possible embodiments, the arm 300 may alternatively be connected to the body 200 in a manner that is expandable or foldable relative to the body 200. For example, the arm 300 may be connected to the body 200 by a rotating shaft mechanism, so that the arm 300 is expandable or foldable relative to the body 200.

In a possible embodiment, the power assembly 400 includes: an electronic velocity control (ESC) (not shown), a drive apparatus 40, and a propeller assembly 80 driven by the drive apparatus 40. The propeller assembly 80 is mounted on an output shaft of the drive apparatus 40, and the propeller assembly 80 rotates under the drive of the drive apparatus 40 to generate lift or thrust for flight of the unmanned aircraft 1000. The ESC is located in a cavity formed by the arm or the center housing. The ESC is separately connected to a controller and a drive motor. Specifically, the ESC is electrically connected to the drive motor, and is configured to control the drive motor. The drive motor is mounted on the arm, and a rotating shaft of the drive motor is connected to a propeller. The propeller, driven by the drive motor, generates a force for moving the UAV, for example, lift or thrust for moving the UAV. The driving apparatus 40 may be any suitable type of motor, such as a brush motor, a brushless motor, a direct current motor, a stepper motor, or an alternating-current induction motor. The intelligent battery provides power for the unmanned aircraft, and drives the drive apparatus 40 to drive the propeller assembly 80 to rotate.

Each specified velocity and action (or attitude) completed by the UAV are implemented by controlling the drive motor by the ESC. A full name of the ESC is an electronic velocity control, which adjusts a rotating velocity of the drive motor of the UAV according to a control signal. The UAV return method is mainly performed by the controller, and the ESC controls the drive motor based on a control instruction. The principle of the ESC controlling the drive motor is substantially as follows: The drive motor is an open-loop control element that converts an electrical pulse signal into an angular displacement or a linear displacement. In a case of non-overload, the rotating velocity and a stop location of the drive motor only depend on a frequency and a quantity of pulses of the pulse signal, and are not affected by a load change. When receiving one pulse signal, a drive drives the drive motor of a power system to rotate by a fixed angle along a set direction, and rotation is implemented at a fixed angle. Therefore, the ESC may control the angular displacement by controlling the quantity of pulses, to implement accurate location; and may also control a velocity and an acceleration of the drive motor by controlling the pulse frequency, to implement velocity control.

Currently, the main functions of the UAV are aerial photography, real-time image transmission, detection of high-risk areas, and the like. To implement the functions such as aerial photography, real-time image transmission, and detection of high-risk areas, a camera assembly is connected to the UAV. Specifically, the UAV and the camera assembly are connected by a connecting structure such as a vibration damping ball. The camera assembly is configured to obtain photographed pictures during aerial photography of the UAV.

Specifically, the camera assembly includes: a gimbal and a photographing apparatus. The gimbal is connected to the UAV. The photographing apparatus is carried on the gimbal, the photographing apparatus may be an image acquisition apparatus for acquiring images, and the photographing apparatus includes, but is not limited to, a camera, a video camera, a camera lens, a scanner, or a camera phone. The gimbal is configured to carry the photographing apparatus, to fix the photographing apparatus, randomly adjust an attitude of the photographing apparatus (for example, change a height, an inclination angle and/or a direction of the photographing apparatus), and stably keep the photographing apparatus in a set attitude. For example, when the UAV performs aerial photography, the gimbal is mainly configured to stably keep the photographing apparatus in a set attitude, to prevent the photographing apparatus from shaking to photograph pictures, and ensure the stability of the photographed pictures.

The gimbal includes: a gimbal motor and a gimbal base. The gimbal motor is mounted on the gimbal base. The controller of the aerial vehicle may alternatively control the gimbal motor by using the ESC of the power system. Specifically, the controller of the aerial vehicle is connected to the ESC, and the ESC is electrically connected to the gimbal motor. The controller of the aerial vehicle generates a gimbal motor control instruction, and the ESC controls the gimbal motor through the gimbal motor control instruction.

The gimbal base is connected to the body of the UAV, and is configured to fixedly mount the camera assembly on the body of the UAV.

The gimbal motor is separately connected to the gimbal base and the photographing apparatus. The gimbal may be a multi-axis gimbal, and accordingly, there are a plurality of gimbal motors. That is, one gimbal motor is disposed on each axis. On one hand, the gimbal motor may drive the photographing apparatus to rotate, to meet horizontal rotation and an adjustment of a pitch angle of a rotating shaft during photographing, and the gimbal motor rotates through manual remote control or the motor automatically rotates by using a program, to implement omnidirectional scanning and monitoring. On the other hand, during the aerial photography of the UAV, interference to which the photographing apparatus is subject is eliminated in real time through the rotation of the gimbal motor, to prevent the photographing apparatus from shaking and ensure the stability of the photographed pictures.

The photographing apparatus is carried on the gimbal, an inertial measurement unit (IMU) is disposed on the photographing apparatus, and the IMU is an apparatus configured to measure a three-axis pose angle (or an angular rate) and acceleration of an object. Generally, a three-axis gyroscope and a three-direction accelerometer are mounted in one IMU, to measure an angular velocity and an acceleration of an object in a three-dimensional (3D) space, and based on this, an attitude of the object is obtained through calculation. To improve the reliability, more sensors may further be configured for each axis. Generally, the IMU is mounted on a center of gravity of the UAV.

The controller is configured to perform the foregoing UAV return method, generates a control instruction, and controls the drive apparatus 40 of the power assembly 400 through the control instruction. The controller is a device with a specific logic processing capability, such as a control chip, a single-chip microcomputer, or a microcontroller unit (MCU).

Figure 2:
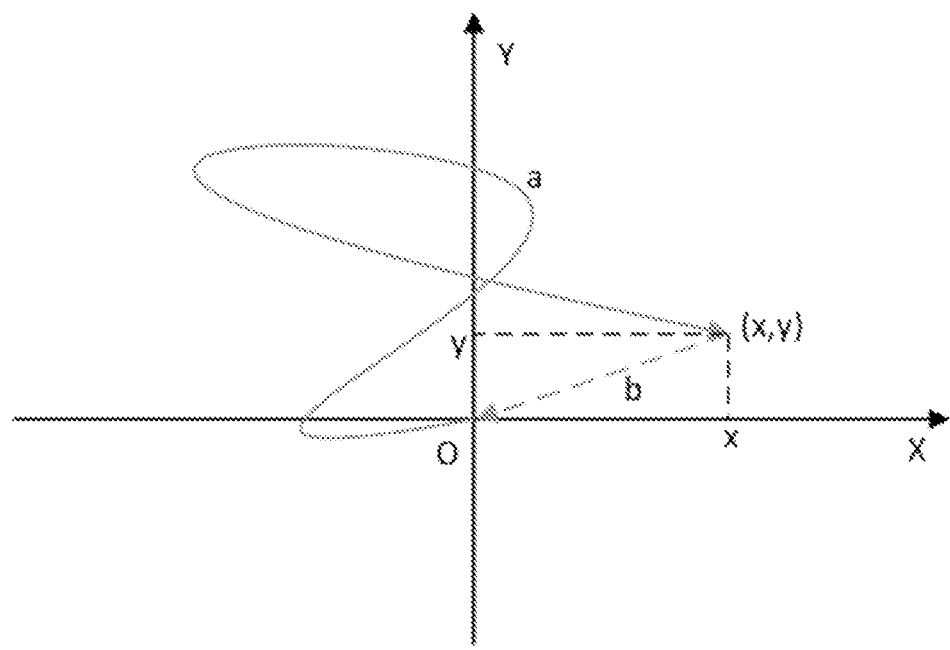
FIG. 2 is a schematic return diagram of a UAV according to an embodiment of the present invention.

Referring to FIG. 2, FIG. 2 is a schematic return diagram of a UAV according to an embodiment of the present invention.

FIG. 2 shows a horizontal plane coordinate system XOY, where an origin O is a takeoff point of the UAV, namely, a takeoff location, a curve a is a flight path of the UAV, a flight end point of the UAV is a return starting point is (x, y), that is, (x, y) is a return starting point location of the UAV, and a curve b is a return path of the UAV.

The UAV takes off from a location of the point O, and in this case, the GPS provides coordinates of the point O. When the precision of a GPS location signal is relatively low, the coordinates of the point O provided by the GPS are inaccurate, and a specific deviation is caused. Referring to FIG.

Figure 3:
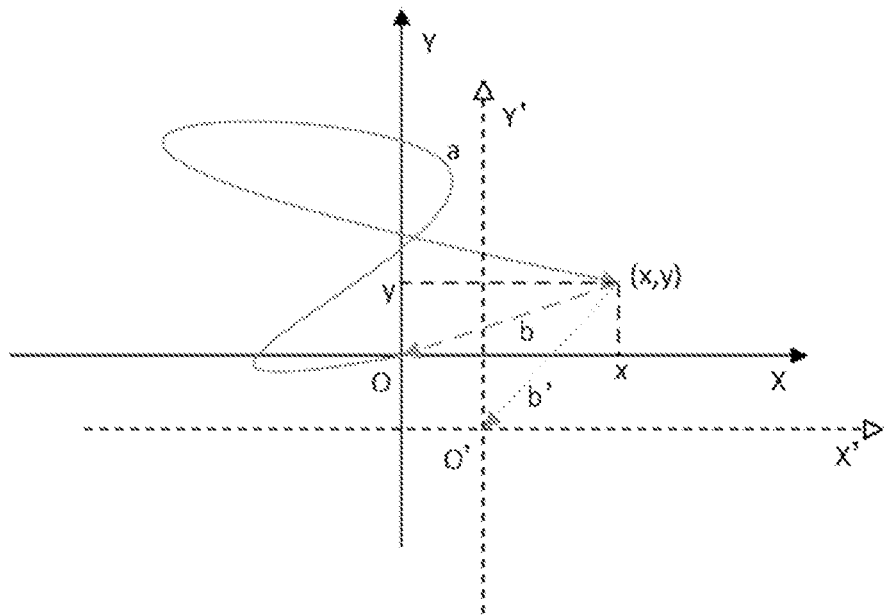
FIG. 3 is another schematic return diagram of a UAV according to an embodiment of the present invention.

3, FIG. 3 is another schematic return diagram of a UAV according to an embodiment of the present invention.

FIG. 3 shows a horizontal plane coordinate system XOY, where an origin O is a takeoff point of the UAV, that is, a takeoff point location is the origin O; and a point O' is a location of coordinates of the takeoff point location provided by the GPS in the XOY coordinate system, a coordinate system X'O'Y' is a horizontal plane coordinate system with the takeoff point O' provided by the GPS as an origin, and a curve b' is a return path of the unmanned aircraft when the point O' is the takeoff point.

Therefore, when the accuracy of the takeoff point O' provided by the GPS heavily relies on the precision of the GPS location signal, if the GPS location precision is poor, the coordinates of the point O' provided by the GPS deviate from coordinates of the point O by a relatively large margin. With the continuous flight of the UAV, the GPS location signal converges to better precision. In this case, the UAV returns, and the initially provided coordinates of the point O' are used as the takeoff location. That is, the unmanned aircraft returns along the curve b' and returns to the takeoff point O'.

It may be understood that from the perspective of the UAV, the coordinate system X'O'Y' deviates from the coordinate system XOY as the GPS location precision decreases during the flight of the UAV, and a degree of deviation is negatively correlated with the GPS location precision of the unmanned aircraft at takeoff. That is, lower GPS location precision of the unmanned aircraft at takeoff indicates a higher degree of deviation.

Figure 4:
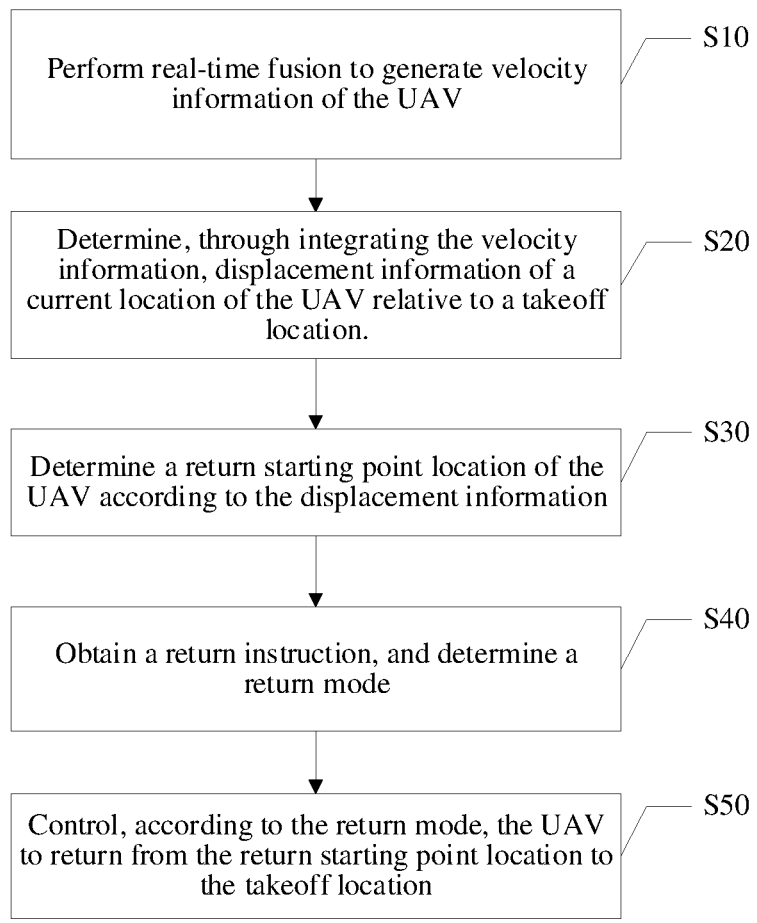
FIG. 4 is a schematic flowchart of a UAV return method according to an embodiment of the present invention.

Therefore, to avoid a return location deviation caused by the GPS location precision, the present invention provides a UAV return method. Specifically, referring to FIG. 4, FIG. 4 is a schematic flowchart of a UAV return method according to an embodiment of the present invention. The UAV return method is applicable to a UAV, for example, an unmanned aircraft.

As shown in FIG. 4, the UAV return method includes the following steps:

Step S10. Perform real-time fusion to generate velocity information of the UAV.

Specifically, the UAV is provided with a GPS module, a visual inertial odometry (VIO), and an IMU. The IMU includes a gyroscope and an accelerometer. The gyroscope is configured to obtain an angular velocity of the IMU, and the accelerometer is configured to: obtain IMU acceleration information, obtain GPS velocity information by using the GPS module, obtain visual information by using the VIO, calculate visual velocity information, obtain IMU acceleration information by using the accelerometer of the IMU, and obtain IMU velocity information through integrating the IMU acceleration information.

The GPS velocity information, the visual velocity information, and the IMU velocity information are fused to generate velocity information of the UAV, and this fusion manner includes: calculating an average value of the GPS velocity information, the visual velocity information, and the IMU velocity information, and using the average value as the velocity information of the UAV. It may be understood that the fusion manner is not limited to calculating an average value, or performing fusion by using a weight.

The performing real-time fusion to generate velocity information of the UAV includes:

performing real-time fusion to generate component velocities of the UAV in two orthogonal directions in a horizontal plane: an x-axis velocity and a y-axis velocity.

The horizontal plane is a plane parallel to a ground plane. For example, the horizontal plane is represented by any of a north-east-down (NED) coordinate system, an east-north-up (ENU) coordinate system, and a north-west-up (NWU) coordinate system.

Specifically, the NED coordinate system is used for navigation calculations. For example, an x-axis velocity in the NED coordinate system is $v_x$ by performing fusion in a horizontal direction, and a y-axis velocity in the NED coordinate system is $v_y$ by performing fusion in the horizontal direction.

Specifically, the ENU coordinate system, also referred to as an earth-fixed coordinate system, is used for navigation calculations. For example, an x-axis velocity in the ENU coordinate system is $v_x$ by performing fusion in a horizontal direction, and a y-axis velocity in the ENU coordinate system is $v_y$ by performing fusion in the horizontal direction.

Specifically, the NWU coordinate system is used for navigation calculations. For example, an x-axis velocity in the NWU coordinate system is $v_x$ by performing fusion in a horizontal direction, and a y-axis velocity in the NWU coordinate system is $v_y$ by performing fusion in the horizontal direction.

An error of the GPS location information is relatively large, and an accurate takeoff point location cannot be provided. Therefore, without adding additional sensors, the UAV can better return by fusing velocity information with higher precision.

Step S20. Determine, through integrating the velocity information, displacement information of a current location of the UAV relative to a takeoff location.

Specifically, by fusing velocity information of the UAV in real time, the velocity information is integrated to obtain a relative distance of the UAV relative to the takeoff point location, and the determining, through integrating the velocity information, displacement information of a current location of the UAV relative to a takeoff location includes:

determining an x-axis displacement between the current location of the UAV and the takeoff location through integrating the x-axis velocity; and determining a y-axis displacement between the current location of the UAV and the takeoff location through integrating the y-axis velocity.

Specifically, assuming that the x-axis velocity of the UAV obtained through fusion in two orthogonal directions in the horizontal plane is $v_x$, and the y-axis velocity obtained through fusion in the horizontal direction is $v_y$, displacement information (ox, oy) of the UAV is obtained through integration by using the following formula:

$$ox = \int_0^\tau v_x(\tau)d\tau$$

$$oy = \int_0^\tau v_y(\tau)d\tau$$

It may be understood that (ox, oy) is a projection of the UAV on the X axis and the Y axis. In this embodiment of the present invention, the takeoff point recorded by the GPS is not used, and a location of the takeoff point is either calculated. Instead, starting from the takeoff point, a relative distance between a current location and a takeoff location is calculated in real time through velocity integration. Therefore, GPS location information is not included, but only fused velocity information is included.

Step S30. Determine a return starting point location of the UAV according to the displacement information.

Specifically, the return starting point location is a current location of the UAV, displacement information is obtained through integrating the velocity information. The displacement information includes an x-axis displacement and a y-axis displacement. The return starting point location of the UAV is determined according to the x-axis displacement and the y-axis displacement. That is, the current location of the UAV is determined by using the displacements.

Step S40. Obtain a return instruction, and determine a return mode.

Specifically, the return instruction is sent by a user to the UAV, and the return instruction includes a return mode determined by the user. For example, the user selects a corresponding return mode, and sends a return instruction to the UAV, so that the controller of the UAV controls the UAV to return in the return mode corresponding to the return instruction. In this embodiment of the present invention, the return mode includes a linear return mode an original path return mode.

Step S50. Control, according to the return mode, the UAV to return from the return starting point location to the takeoff location.

Specifically, when the return mode is the linear return mode, the controlling, according to the return mode, the UAV to return from the return starting point location to the takeoff location includes:

adjusting a heading of the UAV in real time according to the x-axis displacement and the y-axis displacement, so that the heading of the UAV points to the takeoff location.

Specifically, according to the displacement information of the UAV obtained through integration, the x-axis displacement and the y-axis displacement are determined, to obtain the current location (ox, oy) of the UAV. At the current location, by determining a heading angle of the UAV, a heading of the UAV is adjusted in real time, where the heading angle is obtained by calculating the x-axis displacement ox and the y-axis displacement oy through a trigonometric function, so that the heading of the UAV points to the takeoff location.

The x-axis displacement and the y-axis displacement are determined in real time during returning, and if both the x-axis displacement and the y-axis displacement are zero, it is determined that the UAV returns from the return starting point location to the takeoff location.

Specifically, during returning of the UAV, the x-axis displacement and the y-axis displacement are recorded in real time, that is, values of ox and oy are recorded in real time. When the values of ox and oy are both zero, it is determined that the UAV reaches the sky above the takeoff point, and in this case, the UAV is controlled to hover or land. In this embodiment of the present invention, the method further includes: correcting a heading of the UAV by alternately using the x-axis displacement and the y-axis displacement, so that the heading of the UAV points to the takeoff location.

Specifically, when the return mode is the original path return mode, the controlling, according to the return mode, the UAV to return from the return starting point location to the takeoff location includes:

determining coordinates of the takeoff location.

Specifically, coordinates of the takeoff location are determined as the GPS location information provided by the GPS module. The coordinates of the takeoff location are only a selected initial value. Therefore, although the GPS location information obtained by the GPS module is inaccurate, the accuracy of the returning is not affected.

Waypoint coordinates of the UAV are determined in real time according to the displacement information of the current location of the UAV relative to the takeoff location, to generate a waypoint set.

Specifically, coordinates of the takeoff location are determined, and the coordinates of the takeoff location are marked as (m, n);

the waypoint coordinates of the UAV are determined in real time by using the following formula, to generate a waypoint set:

$$P(k) = \left( m + \frac{ox(k)}{\text{lat\_scale}}, n + \frac{oy(k)}{\text{lon\_scale}} \right),$$

where P(k) is the waypoint set, ox(k) is an x-axis displacement of a $k^{th}$ waypoint, oy(k) is a y-axis displacement of the $k^{th}$ waypoint, k is a positive integer, lat_scale is a transform coefficient between the x-axis displacement and a latitude, and lon_scale is a transform coefficient between the y-axis displacement and a longitude.

According to the waypoint set, the UAV is controlled to return from the return starting point location to the takeoff location along an original path.

Specifically, during returning, the UAV returns according to stored waypoint information along an original path, that is, returns from the return starting point location to the takeoff location along the original path. For example, if the waypoint set is P(k), the original returning is represented from P(k) to P(k−1), from P(k−1) to P(k−2), and so on, until P(0).

In this embodiment of the present invention, a UAV return method is provided, including: performing real-time fusion to generate velocity information of the UAV; determining, through integrating the velocity information, displacement information of a current location of the UAV relative to a takeoff location; determining a return starting point location of the UAV according to the displacement information; obtaining a return instruction, and determining a return mode; and controlling, according to the return mode, the UAV to return from the return starting point location to the takeoff location. In the foregoing manner, the present invention resolves the technical problem of poor accuracy that a current UAV returns by relying on GPS location information, and improves the returning accuracy of the UAV.

Embodiment 2

Figure 5:
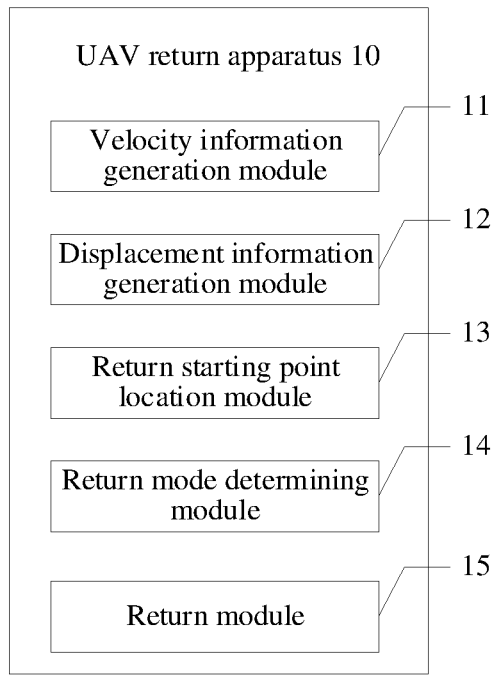
FIG. 5 is a schematic diagram of a UAV return apparatus according to an embodiment of the present invention.

Referring to FIG. 5, FIG. 5 is a schematic diagram of a UAV return apparatus according to an embodiment of the present invention. The UAV return apparatus is applicable to a UAV, such as an unmanned aircraft or an unmanned spacecraft.

As shown in FIG. 5, the UAV return apparatus 10 includes:

a velocity information generation module 11, configured to perform real-time fusion to generate velocity information of the UAV;

a displacement information generation module 12, configured to determine, through integrating the velocity information, displacement information of a current location of the UAV relative to a takeoff location;

a return starting point location module 13, configured to determine a return starting point location of the UAV according to the displacement information;

a return mode determining module 14, configured to obtain a return instruction, and determine a return mode; and a return module 15, configured to control, according to the return mode, the UAV to return from the return starting point location to the takeoff location.

In this embodiment of the present invention, the velocity information generation module 11 is specifically configured to:

perform real-time fusion to generate component velocities of the UAV in two orthogonal directions in a horizontal plane: an x-axis velocity and a y-axis velocity.

In this embodiment of the present invention, the displacement information generation module 12 is specifically configured to:

determine an x-axis displacement between the current location of the UAV and the takeoff location through integrating the x-axis velocity; and determine a y-axis displacement between the current location of the UAV and the takeoff location through integrating the y-axis velocity.

In this embodiment of the present invention, the return starting point location module 13 is specifically configured to:

determine the return starting point location of the UAV according to the x-axis displacement and the y-axis displacement.

In this embodiment of the present invention, the return mode includes a linear return mode, and the return module 15 is specifically configured to:

adjust a heading of the UAV in real time according to the x-axis displacement and the y-axis displacement, so that the heading points to the takeoff location; and determine the x-axis displacement and the y-axis displacement in real time during returning, and if both the x-axis displacement and the y-axis displacement are zero, determine that the UAV returns from the return starting point location to the takeoff location.

Figure 6:
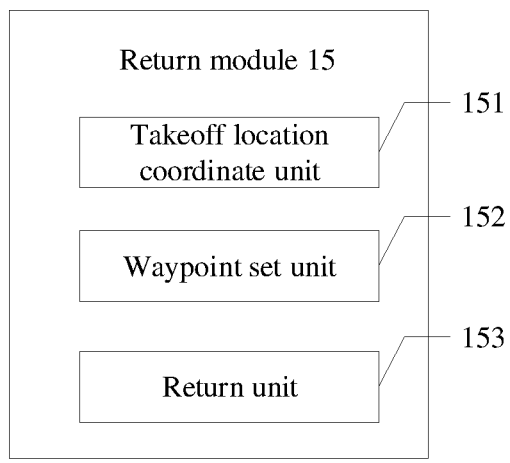
FIG. 6 is a schematic diagram of a return module in FIG. 5.

Referring to FIG. 6, FIG. 6 is a schematic diagram of a return module in FIG. 5.

As shown in FIG. 6, the return module 15 includes:

a takeoff location coordinate unit 151, configured to determine coordinates of the takeoff location;

a waypoint set unit 152, configured to determine waypoint coordinates of the UAV in real time according to the displacement information of the current location of the UAV relative to the takeoff location, to generate a waypoint set; and a return unit 153, configured to control, according to the waypoint set, the UAV to return from the return starting point location to the takeoff location along an original path.

In this embodiment of the present invention, the waypoint set unit 152 is specifically configured to:

determine coordinates of the takeoff location, and marking the coordinates of the takeoff location as (m, n); and determine the waypoint coordinates of the UAV in real time by using the following formula, to generate a waypoint set:

$$P(k) = \left(m + \frac{ox(k)}{\text{lat\_scale}}, n + \frac{oy(k)}{\text{lon\_scale}}\right),$$

where P(k) is the waypoint set, ox(k) is an x-axis displacement of a $k^{th}$ waypoint, oy(k) is a y-axis displacement of the $k^{th}$ waypoint, k is a positive integer, lat_scale is a transform coefficient between the x-axis displacement and a latitude, and lon_scale is a transform coefficient between the y-axis displacement and a longitude.

Figure 7:
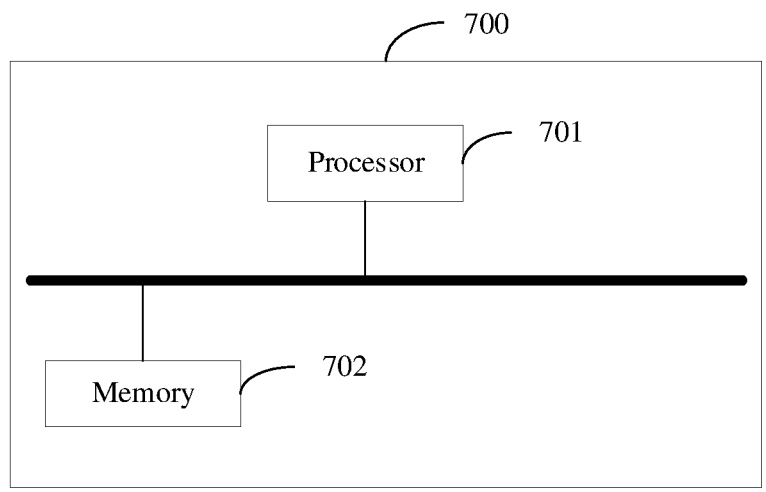
FIG. 7 is a schematic structural diagram of hardware of a UAV according to an embodiment of the present invention.

Referring to FIG. 7, FIG. 7 is a schematic structural diagram of hardware of a UAV according to an embodiment of the present invention. The UAV may include electronic devices such as an unmanned aircraft and an unmanned spacecraft.

As shown in FIG. 7, the UAV 700 includes one or more processors 701 and a memory 702. In FIG. 7, one processor 701 is used as an example.

The processor 701 and the memory 702 may be connected through a bus or in other manners and are, for example, connected through a bus in FIG. 7.

The memory 702, as a non-volatile computer-readable storage medium, may be configured to store a non-volatile software program, a non-volatile computer-executable program and a module, for example, the units (for example, the modules or the units described in FIG. 5 or FIG. 6) corresponding to the UAV return method in the embodiments of the present invention. The processor 701 executes various functional applications and data processing of the UAV return method by running the non-volatile software program, instructions and modules stored in the memory 702, that is, implementing the UAV return method in the foregoing method embodiment and functions of the modules and the units of the foregoing apparatus embodiment. The UAV return method may be performed by various electronic devices with specific logic processing capabilities, such as an aerial vehicle and a control chips. The UAV may include an unmanned aircraft, an unmanned ship, and the like. An example in which the electronic device is an unmanned aircraft is used below for description. The unmanned aircraft is connected to a gimbal. The gimbal includes a gimbal motor and a gimbal base, where the gimbal may be a multi-axis gimbal, such as a two-axis gimbal or a three-axis gimbal. For description of specific structures of the aerial vehicle and the gimbal, refer to the foregoing description, and therefore details are not described herein.

The memory 702 may include a high-velocity random access memory, and may also include a non-volatile memory, such as at least one magnetic disk storage device, a flash memory, or another non-volatile solid-state storage device. In some embodiments, the memory 702 optionally includes memories remotely disposed relative to the processor 701, and these remote memories may be connected to the processor 701 through a network. Examples of the network include, but not limited to, the Internet, an intranet, a local area network, a mobile communication network and a combination thereof.

The modules are stored in the memory 702, and when executed by the one or more processors 701, perform the UAV return method in any of the foregoing method embodiments, for example, perform the steps shown in FIG. 4 described above; or may implement the functions of the modules or units shown in FIG. 5 or FIG. 6.

Figure 8:
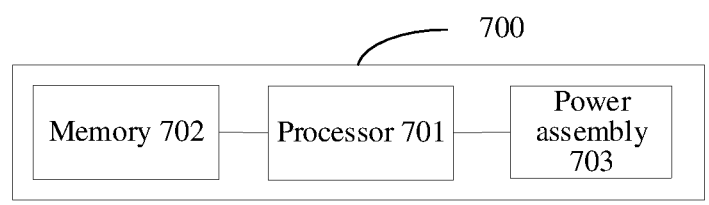
FIG. 8 is a connection block diagram of an aerial vehicle according to an embodiment of the present invention.
Figure 9:
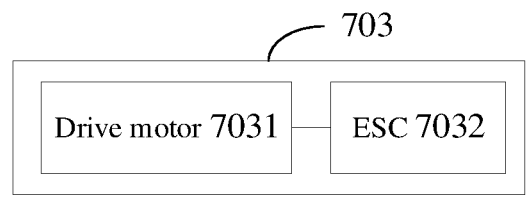
FIG. 9 is a schematic diagram of a power assembly in FIG. 8.

Referring to FIG. 8 and FIG. 9, the UAV 700 further includes a power assembly 703. The power assembly 703 is configured to provide flight power for the aerial vehicle, and the power assembly 703 is connected to the processor 701. The power assembly 703 includes a drive motor 7031 and an ESC 7032. The ESC 7032 is electrically connected to the drive motor 7031, and is configured to control the drive motor 7031. Specifically, the ESC 7032 performs the foregoing UAV return method based on the processor 701, generates a control instruction, and controls the drive motor 7031 through the control instruction.

The UAV 700 may perform the UAV return method provided in the embodiments of the present invention, and has the corresponding functional modules and beneficial effects for performing the method. For technical details not described in detail in the embodiments of the UAV, refer to the UAV return method provided in the embodiments of the present invention.

In this embodiment of the present invention, a UAV return apparatus is provided, applicable to a UAV, the apparatus including: a velocity information generation module, configured to perform real-time fusion to generate velocity information of the UAV; a displacement information generation module, configured to determine, through integrating the velocity information, displacement information of a current location of the UAV relative to a takeoff location; a return starting point location module, configured to determine a return starting point location of the UAV according to the displacement information; a return mode determining module, configured to obtain a return instruction, and determine a return mode; and a return module, configured to control, according to the return mode, the UAV to return from the return starting point location to the takeoff location. In the foregoing manner, the embodiments of the present invention can resolve the technical problem of poor accuracy that a current UAV returns by relying on GPS location information, and improve the returning accuracy of the UAV.

The embodiments of the present invention provide a computer program product, including a computer program stored in a non-volatile computer-readable storage medium, the computer program including program instructions, the program instructions, when executed by a computer, causing the computer to perform the UAV return method described above. For example, step S10 to step S50 in the foregoing method in FIG. 4 are performed.

The embodiments of the present invention further provide a non-volatile computer storage medium, storing computer executable instructions, the computer executable instructions being executed by one or more processors, for example, one processor 701 in FIG. 7, so that the foregoing one or more processors may perform the UAV return method in any of the foregoing method embodiments, for example, the foregoing steps shown in FIG. 4; or may implement the functions of the modules or units shown in FIG. 5 or FIG. 6.

The foregoing described apparatus or device embodiment is merely exemplary. The units or modules described as separate parts may or may not be physically separate, and parts displayed as modules or units may or may not be physical units, may be located in one location, or may be distributed on a plurality of network modules or units. Some or all of the modules may be selected based on an actual requirement, to achieve the objectives of the solutions of the embodiments.

Based on the descriptions of the foregoing implementations, a person skilled in the art may clearly understand that the implementations may be implemented by software in addition to a universal hardware platform, or by hardware. Based on such an understanding, the technical solutions essentially or the part contributing to the related art may be implemented in a form of a computer software product. The computer software product may be stored in a computer-readable storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

Finally, it should be noted that the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above. These changes are not provided in detail for simplicity. It should be understood by a person of ordinary skill in the art that although the present invention has been described in detail with reference to the foregoing embodiments, modifications can be made to the technical solutions described in the foregoing embodiments, or equivalent replacements can be made to some technical features in the technical solutions; and these modifications or replacements do not cause the essence of corresponding technical solutions to depart from the scope of the technical solutions in the embodiments of this application.

What is claimed is:

1. An unmanned aerial vehicle (UAV) return method, applicable to an UAV, the method comprising:
performing real-time fusion to generate velocity information of the UAV;
determining, through integrating the velocity information, displacement information of a current location of the UAV relative to a takeoff location;
determining a return starting point location of the UAV according to the displacement information;
obtaining a return instruction, and determining a return mode; and
controlling, according to the return mode, the UAV to return from the return starting point location to the takeoff location;
wherein the performing real-time fusion to generate velocity information of the UAV comprises;
performing real-time fusion to generate velocities of the UAV in two orthogonal directions in a horizontal plane: an x-axis velocity and a y-axis velocity;
wherein the determining, through integrating the velocity information, displacement information of a current location of the UAV relative to a takeoff location comprises;
determining x-axis displacement between the current location of the UAV and the takeoff location through integrating the x-axis velocity; and
determining a y-axis displacement between the current location of the UAV and the takeoff location through integrating the y-axis velocity.

2. The method according to claim 1, wherein the determining a return starting point location of the UAV according to the displacement information comprises:
determining the return starting point location of the UAV according to the x-axis displacement and the y-axis displacement.

3. The method according to claim 1, wherein in response to the return mode comprises a linear return mode,
the controlling, according to the return mode, the UAV to return from the return starting point location to the takeoff location comprises:

adjusting a heading of the UAV in real time according to the x-axis displacement and the y-axis displacement, so that the heading of the UAV points to the takeoff location; and determining the x-axis displacement and the y-axis displacement in real time during returning, and in response to both the x-axis displacement and the y-axis displacement are zero, determining that the UAV returns from the return starting point location to the takeoff location.

4. The method according to claim 1, wherein in response to the return mode comprises an original path return mode, the controlling, according to the return mode, the UAV to return from the return starting point location to the takeoff location comprises:

determining coordinates of the takeoff location;

determining waypoint coordinates of the UAV in real time according to the displacement information of the current location of the UAV relative to the takeoff location, to generate a waypoint set; and controlling, according to the waypoint set, the UAV to return from the return starting point location to the takeoff location along an original path.

5. The method according to claim 4, wherein the determining waypoint coordinates of the UAV in real time according to the displacement information of the current location of the UAV relative to the takeoff location, to generate a waypoint set comprises:

determining the coordinates of the takeoff location, and marking the coordinates of the takeoff location as (m, n); and determining the waypoint coordinates of the UAV in real time according to the displacement information of the current location of the UAV relative to the takeoff location by using the following formula, to generate a waypoint set:

$$P(k) = \left(m + \frac{ox(k)}{lat\_scale}, n + \frac{oy(k)}{lon\_scale}\right),$$

wherein P(k) is the waypoint set, ox(k) is an x-axis displacement of a $k^{th}$ waypoint, oy (k) is a y-axis displacement of the $k^{th}$ waypoint, k is a positive integer, lat_scale is a transform coefficient between the x-axis displacement and a latitude, and lon_scale is a transform coefficient between the y-axis displacement and a longitude.

6. An unmanned aerial vehicle (UAV) return apparatus, applied to an UAV, the apparatus comprising at least one processor, and a memory communicatively connected to the at least one processor, wherein the memory stores instructions executable by the at least one processor, and the instructions are executed by the at least one processor to cause the at least one processor to:

perform real-time fusion to generate velocity information of the UAV;

determine, through integrating the velocity information, displacement information of a current location of the UAV relative to a takeoff location;

determine a return starting point location of the UAV according to the displacement information;

obtain a return instruction, and determine a return mode; and control, according to the return mode, the UAV to return from the return starting point location to the takeoff location;

perform real-time fusion to generate component velocities of the UAV in two orthogonal directions in a horizontal plane: an x-axis velocity and a y-axis velocity;

determine an x-axis displacement between the current location of the UAV and the takeoff location through integrating the x-axis velocity; and determine a y-axis displacement between the current location of the UAV and the takeoff location through integrating the y-axis velocity.

7. The apparatus according to claim 6, wherein the processor is configured to:

determine the return starting point location of the UAV according to the x-axis displacement and the y-axis displacement.

8. The apparatus according to claim 6, wherein the return mode comprises a linear return mode, and the processor is specifically configured to:

adjust a heading of the UAV in real time according to the x-axis displacement and the y-axis displacement, so that the heading points to the takeoff location; and determine the x-axis displacement and the y-axis displacement in real time during returning, and in response to both the x-axis displacement and the y-axis displacement are zero, determine that the UAV returns from the return starting point location to the takeoff location.

9. The apparatus according to claim 6, wherein the return mode comprises an original path return mode, and the processor includes:

determining coordinates of the takeoff location;

determining waypoint coordinates of the UAV in real time according to the displacement information of the current location of the UAV relative to the takeoff location, to generate a waypoint set; and controlling, according to the waypoint set, the UAV to return from the return starting point location to the takeoff location along an original path.

10. The apparatus according to claim 9, wherein the processor is configured to:

determine the coordinates of the takeoff location, and marking the coordinates of the takeoff location as (m, n); and determining the waypoint coordinates of the UAV in real time according to the displacement information of the current location of the UAV relative to the takeoff location by using the following formula, to generate a waypoint set:

$$P(k) = \left(m + \frac{ox(k)}{lat\_scale}, n + \frac{oy(k)}{lon\_scale}\right),$$

wherein P(k) is the waypoint set, ox(k) is an x-axis displacement of a $k^{th}$ waypoint, oy (k) is a y-axis displacement of the $k^{th}$ waypoint, k is a positive integer, lat_scale is a transform coefficient between the x-axis displacement and a latitude, and lon_scale is a transform coefficient between the y-axis displacement and a longitude.

11. An unmanned aerial vehicle (UAV), comprising:

at least one processor, and a memory communicatively connected to the at least one processor, wherein the memory stores instructions executable by the at least one processor, and the instructions are executed by the at least one processor to cause the at least one processor to:

perform real-time fusion to generate velocity information of the UAV;

determine, through integrating the velocity information, displacement information of a current location of the UAV relative to a takeoff location;

determine a return starting point location of the UAV according to the displacement information;

obtain a return instruction, and determine a return mode; and control, according to the return mode, the UAV to return from the return starting point location to the takeoff location;

perform real-time fusion to generate component velocities of the UAV in two orthogonal directions in a horizontal plane an x-axis velocity and a y-axis velocity;

determine a x-axis di placement between the current location of the UAV and the takeoff location through integrating the x-axis velocity; and determine y-axis displacement between the current location of the UAV and the takeoff location through integrating the y-axis velocity.

12. The UAV according to claim 11, wherein the processor is configured to:

determine the return starting point location of the UAV according to the x-axis displacement and the y-axis displacement.

13. The UAV according to claim 11, wherein the return mode comprises a linear return mode, and the processor is specifically configured to:

adjust a heading of the UAV in real time according to the x-axis displacement and the y-axis displacement, so that the heading points to the takeoff location; and determine the x-axis displacement and the y-axis displacement in real time during returning, and if both the x-axis displacement and the y-axis displacement are zero, determine that the UAV returns from the return starting point location to the takeoff location.

14. The UAV according to claim 11, wherein the return mode comprises an original path return mode, and the processor includes:

determining coordinates of the takeoff location;

determining waypoint coordinates of the UAV in real time according to the displacement information of the current location of the UAV relative to the takeoff location, to generate a waypoint set; and controlling, according to the waypoint set, the UAV to return from the return starting point location to the takeoff location along an original path.

15. The UAV according to claim 14, wherein the processor is configured to:

determine the coordinates of the takeoff location, and marking the coordinates of the takeoff location as (m, n); and determining the waypoint coordinates of the UAV in real time according to the displacement information of the current location of the UAV relative to the takeoff location by using the following formula, to generate a waypoint set:

$$P(k) = \left(m + \frac{ox(k)}{\text{lat\_scale}}, n + \frac{oy(k)}{\text{lon\_scale}}\right),$$

wherein P(k) is the waypoint set, ox(k) is an x-axis displacement of a $k^{th}$ waypoint, oy(k) is a y-axis displacement of the $k^{th}$ waypoint, k is a positive integer, lat_scale is a transform coefficient between the x-axis displacement and a latitude, and lon_scale is a transform coefficient between the y-axis displacement and a longitude.

* * * * *